US005602365A

United States Patent [19]

Bobadilla et al.

[11] Patent Number: 5,602,365

[45] Date of Patent: Feb. 11, 1997

[54] MICROWAVE DUPLEXER AND COMPONENT

[75] Inventors: Omar J. Bobadilla, Parsippany; John M. DelColle, Morris Township, Morris County; Andy Y. Ng, Edison; Gary D. Stuck, Matawan, all of N.J.

[73] Assignee: Lucent Technologies Inc., Murray Hill, N.J.

[21] Appl. No.: 263,624

[22] Filed: Jun. 22, 1994

Related U.S. Application Data

[63] Continuation of Ser. No. 955,596, Oct. 9, 1992, abandoned, and a continuation of Ser. No. 147,106, Nov. 3, 1993, abandoned, which is a continuation of Ser. No. 955,577, Oct. 2, 1992, abandoned.

[51] Int. Cl.[6] .................................................... H02G 15/08

[52] U.S. Cl. .................. 174/71 C; 174/75 C; 174/88 C; 333/134; 333/260; 439/583

[58] Field of Search ............................. 174/71 C, 75 C, 174/88 C; 333/126, 129, 134, 136, 260; 16/108; 439/578, 583, 433

[56] References Cited

U.S. PATENT DOCUMENTS

| | | | |
|---|---|---|---|
| 4,619,496 | 10/1986 | Forney, Jr. et al. . | |
| 5,044,990 | 9/1991 | Knotts | 439/578 |
| 5,070,265 | 12/1991 | Williams et al. | 439/433 X |
| 5,167,533 | 12/1992 | Rauwolf | 439/583 |
| 5,195,910 | 3/1993 | Enomoto et al. | 439/578 |
| 5,274,347 | 12/1993 | Bobadilla | 333/134 X |
| 5,304,962 | 4/1994 | Bobadilla et al. | 333/134 |

OTHER PUBLICATIONS

"Connectors FSJ1–50A Superflexible Coaxial Cable" Installation Instructions, Andrew Corp. 1980.

"Connectors FSJ4–50B Superflexible Foam–Dielectric Coaxial Cable" Installation Instructions, Andrew Corp. Nov. 1990.

"Connector Design Techniques to Avoid RFI" Charles E. Young, Naval Research Laboratory, Washington, DC, pp. 174–184 No Date.

"Silver Plating, Electrodeposited, General Requirements", Federal Specification QQ–S–365D, Jun. 3, 1985.

"Price List Filters and Delay Lines" Penny Technologies, Inc., May 1, 1992.

"Catalog 35 Systems Planning Product Specifications Services", Andrew Corp., pp. 354–359.

"Intermod and Connectors: Silver Plate Beats Nickel", by Manny Gutsche, Mobile Radio Technology, Mar. 1992.

"An Update on Intermodulation Generation by RF Connector Hardware Containing Ferromagnetic Material" by Charles Young, Naval Research Laboratory, Washington, DC, pp. 266–284.

"Micro–Miniature & Ultra–Miniature Coaaxial Connectors & Cables", Microdot, Inc., 1959.

"Connectors And RF Components", Industrial Products Co., Danbury, Conn.

*Primary Examiner*—Kristine L. Kincaid
*Assistant Examiner*—Paramita Ghosh

[57] ABSTRACT

A duplexer, useable to interlink the receiver, transmitter and antenna units of a microwave transmit/receive system takes the form of a "T" junction coupling device and three coaxial lines extending from junction ends at such device to coaxial end connectors on the ends of such lines away from such device. The "T" junction coupling device comprises a copper block having a central cavity and three bores leading into such cavity, a copper cap to close the top of such cavity, a copper disc disposed in said cavity away from its walls and containing a central space and three passages leading into said spaces and corresponding to said bores, and three brass ferrules for such lines. The ferrules are seated on the junction ends of such lines and are soldered to their outer conductors and are pressed fitted into the three bores. The inner conductors are received in the three passages in the disc and are all soldered thereto. The duplexer is free of ferromagnetic materials and contact non-linearities to forestall generation of intermodulation products. The components of the T junction coupling device and the metal parts of the end connectors are all silver plated to reduce microwave resistance losses and to prevent non-linearity due to corrosion.

17 Claims, 8 Drawing Sheets

MICROWAVE DUPLEXER AND COMPONENT

RELATED APPLICATIONS

This application is a continuation of U.S. patent application, Ser. No. 08/147,106, filed Nov. 3, 1993, now abandoned, in the name of A. Y. Ng for "End Ferrule For Coaxial Line", which was a continuation of parent U.S. patent application, Ser. No. 07/955,577, filed Oct. 2, 1992, now abandoned by the same inventor with the same title (now abandoned), and this application is also a continuation of U.S. patent application, Ser. No. 07/955,596, filed Oct. 9, 1992, now abandoned in the name of Omar J. Bobadilla et al. for "Microwave Duplexer".

FIELD OF THE INVENTION

This invention relates generally to microwave communication systems and, more particularly, to improvements in the microwave duplexers and ferrules used in such systems. While the invention will be specifically disclosed herein in terms of its application to ferrules and duplexers used in duplex base station cellular telephony transmit/receive systems, the invention is not so limited in application and has other applications.

BACKGROUND OF THE INVENTION

In a base station cellular telephony system comprising transmitter and receiver units, the output of the transmitter and the input of the receiver consist, respectively, of signals in multiple channels included within a defined transmitted band of frequencies and signals in multiple channels included within a defined received band of frequencies separated by a gap in the frequency domain from the transmitted band. Such system transmits and receives signals simultaneously.

Because of the simultaneity of occurrence of signals transmitted from and received by such a system and the consequent danger of interference between those two kinds of signals, it was common practice in the past for such systems to be a simplex system in which the transmitter and receiver each had its own antenna, and the two antennas were spaced apart by a distance far enough to prevent any such interference from occurring to a significant degree.

As a cost saving measure however, the art has recently turned to, instead of such simplex systems, a base station cellular telephony system in which one of those two antennas is eliminated, and the system becomes a duplex system in which the one remaining antenna is a common antenna for both the transmitter unit and the receiver unit. In such a duplex system those two units and the one antenna are interlinked through a microwave plumbing assemblage comprising a duplexer and first and second interdigital bandpass filters which are respectively coupled to the transmitter's output and the receiver's input.

The duplexer comprises a T junction coupling means and three coaxial lines all coupled at one of their ends to such junction means, a first and second of such lines being coupled at their ends away from such junction means by coaxial connectors on such lines to, respectively, the output of the first filter and the input of the second filter. The third of such lines is coupled at its end away from that junction means by a coaxial connector on such line to the common antenna. The first and second filters are designed to pass, respectively, the transmission band and the reception band and to reject signals outside of the pass band of the filter. The microwave assemblage is designed to, in effect, steer signals from the transmitter to the antenna but not to the receiver and, simultaneously, to steer signals received by the antenna to the receiver but not to the transmitter. In this way, the system is intended to prevent the transmitted signals from interfering with the signals received by the receiver, and conversely.

When, however, experimental field trials were recently made of base station cellular telephony duplex systems wherein the plumbing assemblages incorporated components made in accordance with prevailing commercial practices, it was found that the sensitivity of the receiver was degraded by the presence at its input of an inordinately high level of electromagnetic interference. In the duplexers used in such field trials, contact non-linearities existed in those duplexers because of the presence therein of loose contacts between the conventional coaxial lines of the duplexer and six conventional coaxial connectors used at the T junction to connect, respectively, the outer conductors of those lines together and the inner conductors of those lines together. The interference was in the form of intermodulation products of frequencies lying within the reception band and generated by signals in different channels in the transmitted band by having an interaction with each other induced by non-linear electrical effects occurring within components of the microwave plumbing assemblage. A significant fraction of such interfering intermodulation products were caused by the presence in the duplexers used in such trials of such contact non-linearities caused by such loose contacts and of ferromagnetic materials.

SUMMARY OF THE INVENTION

In accordance with the invention in one of its aspects, the intermodulation product interference described above as observed during the mentioned field trials has been much reduced for the entire duplex system, and, also, for the described duplexers, by replacing the duplexers used in the field trials by improved duplexes consisting entirely of nonferromagnetic materials.

According to the invention in another of its aspects, such intermodulation products have been reduced (or eliminated) by replacing the T junction means utilizing the mentioned six coaxial connectors by an improved T junction means comprising a metallic block with a central cavity and three bores passing through the block into such cavity, such T junction means also comprising three ferrules fitted (or adapted to be fitted) on the junction ends of the three coaxial lines and electromechanically united with their outer conductors, those ferrules being (or adapted to be) press-fitted into such bores and the inner conductors of such lines extending from such bores into the central cavity to a common electrical junction with each other.

According to the invention in still another of its aspects, the mentioned ferrules are improved ferrules adapted to be screwed into the ends of coaxial lines having helically threaded outer conductors and/or to provide strain relief for such lines.

BRIEF DESCRIPTION OF THE DRAWING

For a better understanding of the invention, reference is made to the following description of an exemplary embodiment thereof, and to the accompanying drawings wherein.

Figure 1:
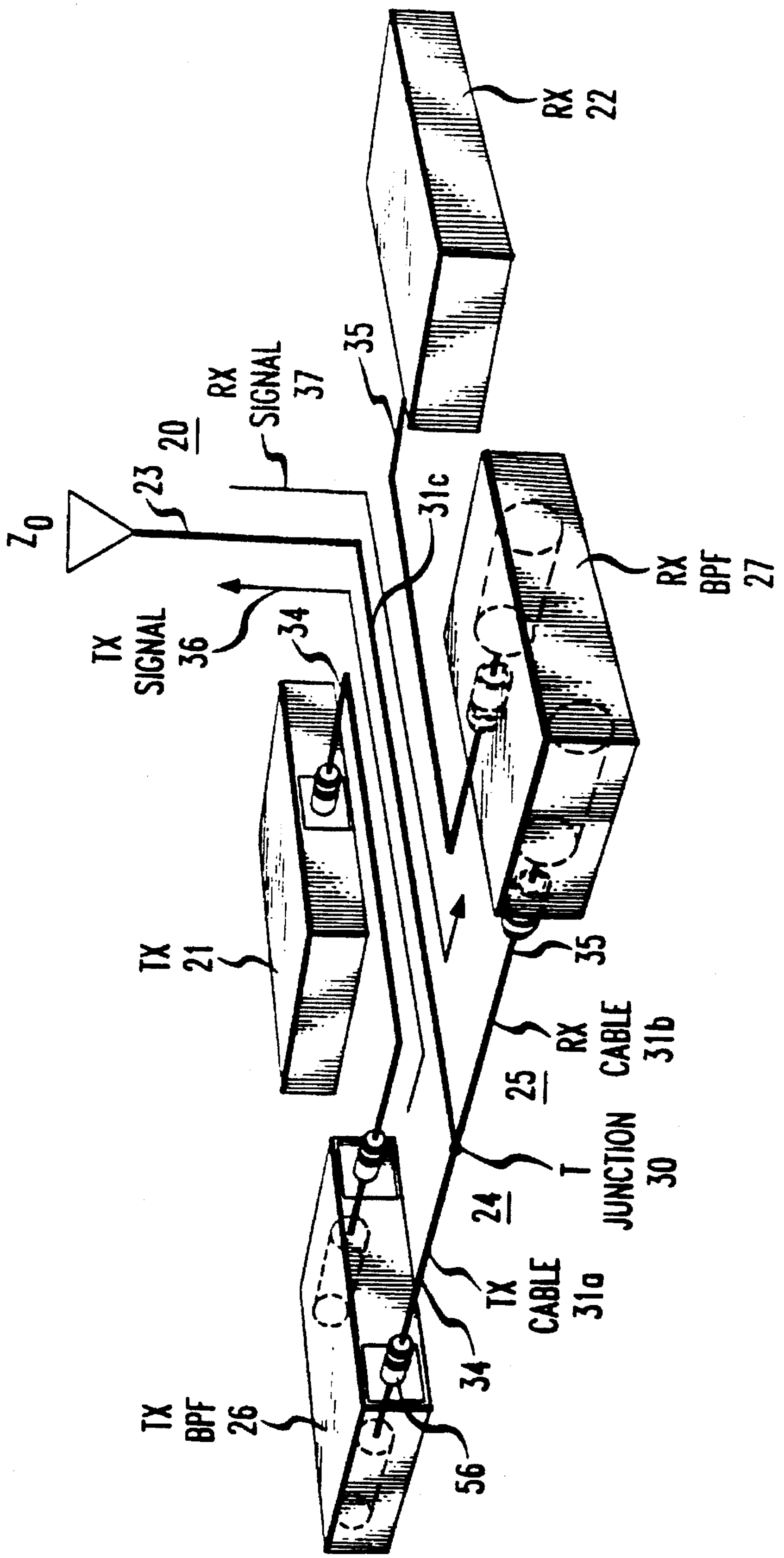
FIG. 1 is a schematic diagram of a base station cellular telephony duplex transmit-receive system embodying the invention.

In the description which follows, elements which are counterparts of each other may be designated by the same reference numerals having different letter suffixes, and it is to be understood that a description of any of such elements shall, unless the context otherwise indicates, be taken as applying equally to its counterparts.

DETAILED DESCRIPTION OF THE EMBODIMENT

Referring now to FIG. 1, the reference numeral 20 designates a base station cellular telephone duplex transmit/receive system comprising two items of microwave communications equipment, namely, a transmitter unit 21, and a receiver unit 22. The system also includes an antenna 23 common to both units 21 and 22. Elements 21, 22 and 23 are interlinked by a microwave assemblage 24 comprising a duplexer 25 and first and second interdigital bandpass filters 26 and 27.

The duplexer 25 is represented schematically in FIG. 1, and it consists of a T junction coupling means 30 and first, second and third coaxial lines 31*a*, 31*b* and 31*c*. Lines 31*a* and 31*b* are coupled in first and second microwave transmission paths 34 and 35 extending between the T junction coupling means 30 and, respectively, the transmitter 21 and the receiver 22 so that those lines at one of their ends are coupled directly to the T junction coupling means 30. The first or "transmitter" filter 26 is coupled in such first path 34 between coaxial line 31*a* and transmitter 21 so as to provide part of such path and to pass through the filter microwave "transmitted" signals represented by arrow 36 and traveling from transmitter 21 to T junction coupling means 30 and then to antenna 23. Similarly, the second or "receiver" filter 27 is coupled between coaxial line 31*b* and receiver 22 to provide part of the second mentioned microwave path 35, and to pass through the filter received signals represented by arrow 37 and traveling from antenna 23 via T junction coupling means 30 to receiver 22.

The paths 34 and 35 are referred to herein as being microwave transmission paths because they transmit microwaves therethrough. In such connection a "microwave" is defined in the *American Heritage Dictionary*, Second College Edition, published in 1989 by Houghton Mifflin Company, Boston, Mass., as being "An electromagnetic wave having a wavelength in the approximate range from one millimeter to one meter". In the text "Fundamentals of Radio and Electronics" by William L. Everett, Second Edition, published in 1958 by Prentice-Hall, Inc., Englewood Cliffs, N.J., it is disclosed that "The velocity of electromagnetic waves is 300,000,000 meters per second and with them it requires an oscillation frequency of 300 megacycles to produce a wave 1 meter long". It follows that a microwave as defined above is, when specified in terms of its frequency, an electromagnetic wave having a frequency in the range from 300 megahertz to 300 gigahertz.

The coaxial lines 31*a* and 31*b* have, between T junction coupling means 30 and their associated filters 26, 27, respective electrical lengths, which are equal to, respectively, $n/_2\ (\lambda_r)$ and $n/_2\ (\lambda_t)$ where n is an integer (which can be different for the two lines), $\lambda_t$ is a wavelength selected as typical of the transmitted signal 36, and $\lambda_r$ is a wavelength selected as typical of the received signal 37. Because lines 31*a* and 31*b* have such lengths, the transmitted signal 36 from transmitter 21 sees at junction 30 an approximately open impedance looking into line 31*b* towards filter 27 and, similarly, the received signal 37 from antenna 23 sees at junction 30 an approximately open impedance looking into line 31*a* towards filter 26. As a result the signals 36 and 37 as they reach junction 30 are preferentially steered towards, respectively, the antenna 23 and the receiver 22 as depicted in FIG. 1 by the arrows representing those signals.

When the microwave assemblage incorporates components consisting of off-the-shelf items made according to prevailing standard commercial practice, the result is, as earlier described, that the receiver 22 is badly desensitized by being exposed to an inordinately higher level of interference caused by intermodulation products derived from signals in various channels in the multiple channels in the wide band transmitted signal 36. As also earlier mentioned, a significant fraction of such interference observed in the past originated in the duplexer when such duplexer was constituted of off-the-shelf standard commercial components. The improved duplexer 25 according to the invention will now be described.

Figure 2:
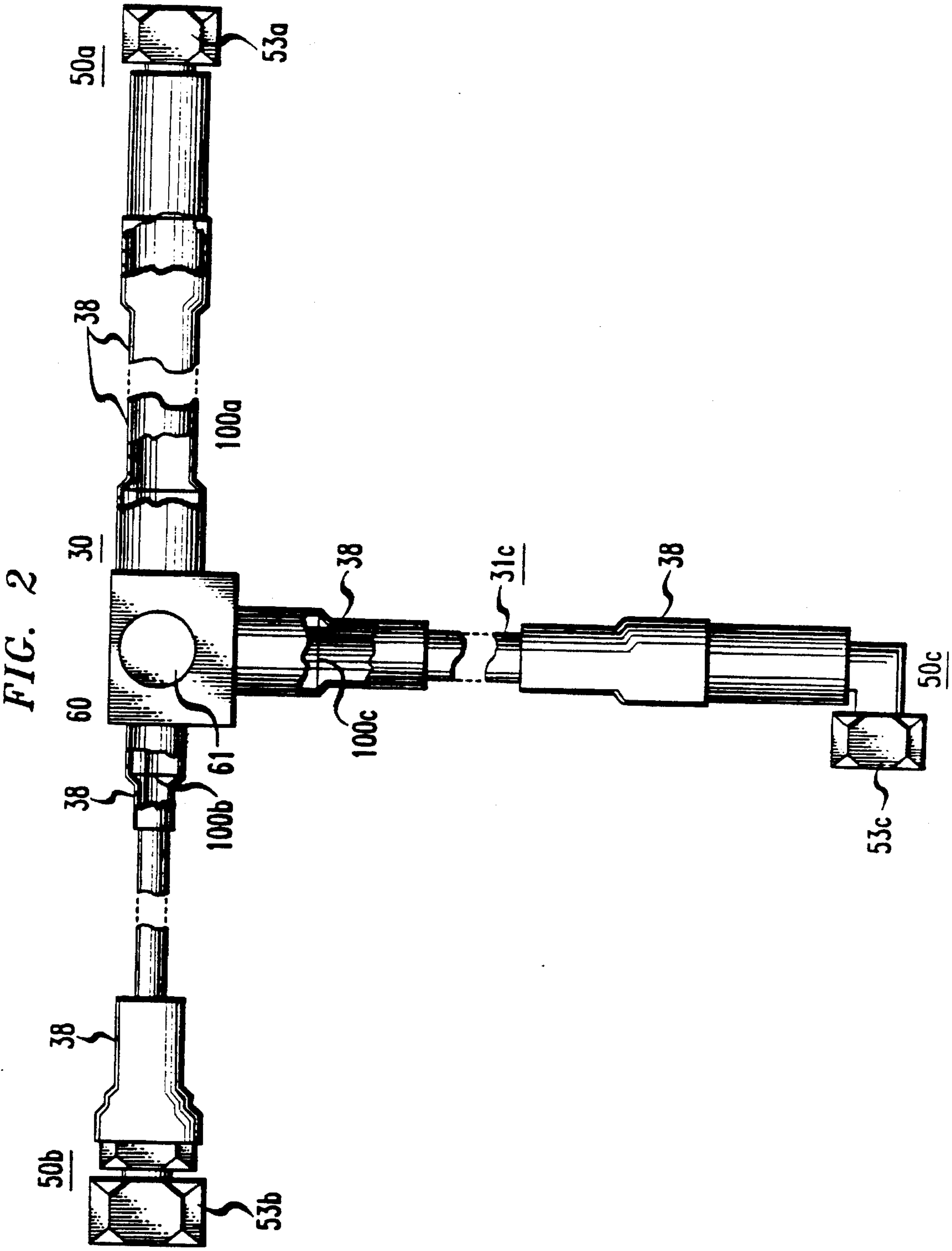
FIG. 2 is a plan view of the duplexer of the FIG. 1 system; such duplexer being rotated 180° in the horizontal plane from its showing in FIG. 1.
Figure 3:
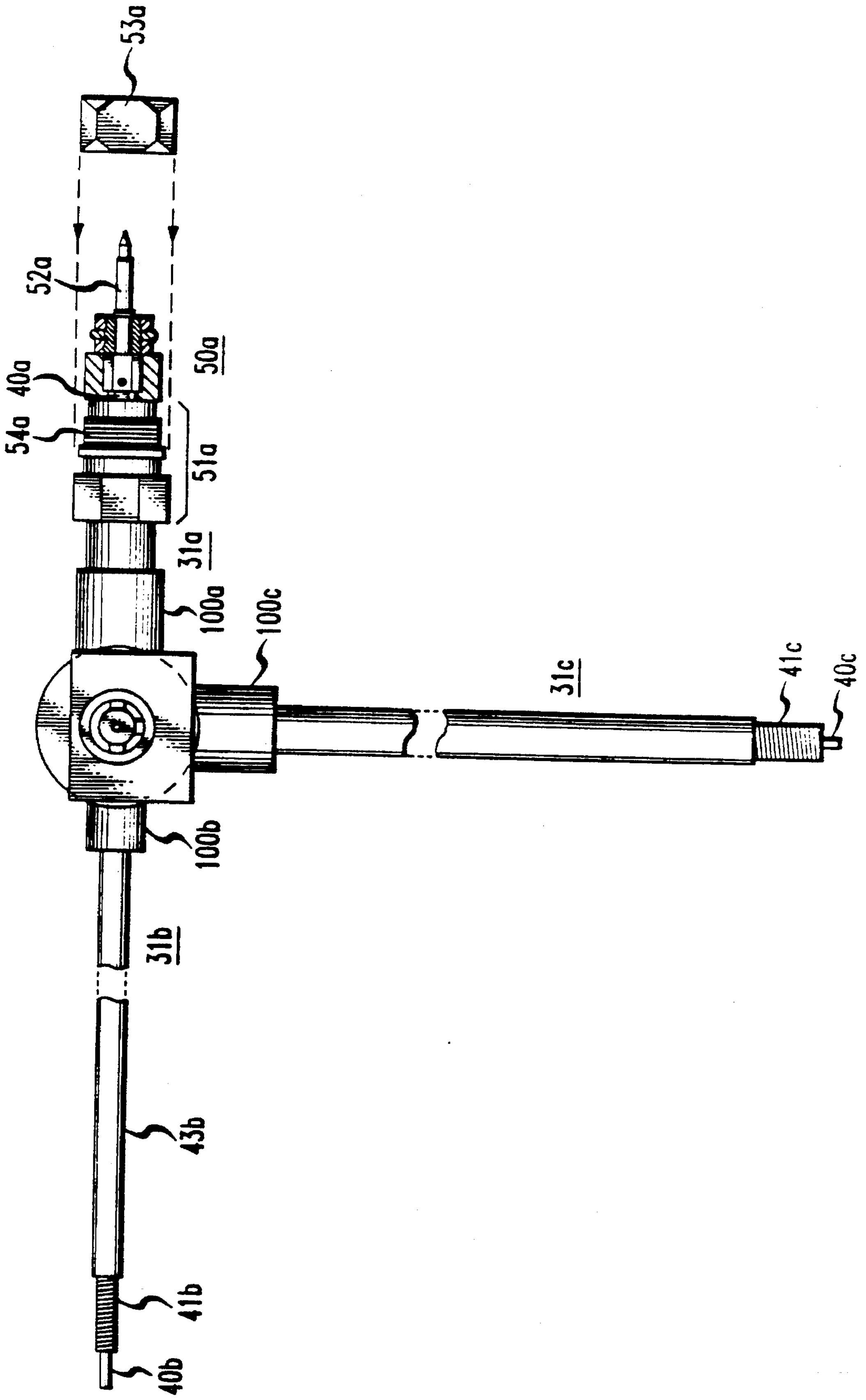
FIG. 3 is a plan view of the FIG. 2 duplexer in partly completed form.

Referring to FIGS. 2 and 3, the transmitter coaxial line 31*a*, receiver coaxial line 31*b* and antenna coaxial line 31*c* extend from junction ends of such lines at the T junction coupling means 30 to remote ends of such lines displaced away from such means. Each of such lines is a section of a Heliax™ superflexible foam dielectric coaxial cable obtainable from the Andrew Corporation, 10500 West 153rd Street, Orland Park, Ill. 60462.

The lines 31*a*, 31*b* and 31*c* are fabricated from different types of such superflexible cable, the transmitter and antenna lines 31*a* and 31*c* being sections of such cable designated as type FSJ4RN-50B (½") while the receiver line 31*b* is a section of such cable designated as FSJ4RN-50A (¼"). For the transmitter and receiver lines 31*a* and 31*b*, the value of the mentioned integer n is equal to 1 and 2, respectively, so that transmitter line 31*a* has between its junction and remote ends, an electrical length of approximately one half wave length for the received band of signals. In contrast, receiver line 31*b* has, between those ends an electrical length of approximately one full wavelength (i.e., two haft wavelengths) for the transmitted band of signals. The antenna line 31*c* has an impedance which matches that of the antenna 23 and the filters 26 and 27.

In the completed duplexer 25 shown in FIG. 2, the coaxial lines 31*a*, 31*b* and 31*c* are contained within Raychem ATUM™ heat shrink tubes 38 obtainable from the Raychem Corp. 100 Dickerson Drive, Chadds Ford, Pa. 19317. Tubes 38 are plastic tubes which are fitted in heated condition over lines 31 and over the connectors and ferrules (later described) at the ends of such lines, and which tubes 38 shrink upon cooling to provide strain relief for lines 31.

FIG. 3 shows coaxial lines 31*b* and 31*c* prior to the time when end connectors have been fitted on their remote ends. As exemplified by the showing in FIG. 3 of those ends, the coaxial lines 31 comprise (a) respective inner conductors 40 which are copper clad aluminum solid conductors (b) respective copper outer conductors 41 maintained by (c) solid foam dielectric material 42 such as material 42*b* (FIG. 11) in concentric radially spaced relation with such inner conductors, and (d) respective plastic jackets 43 (FIG. 10) ensheathing outer conductors 41. The jackets 43 terminate at both ends of such lines short of the terminations of their outer conductors 41 so as to leave the exteriors of these conductors bare of such jacket at the remote ends of the lines (FIG. 3) and at their junction ends (FIGS. 10–13). At both of such ends, the inner conductors 40 of the lines project outwardly from the terminations of their outer conductors 41.

Figure 11:
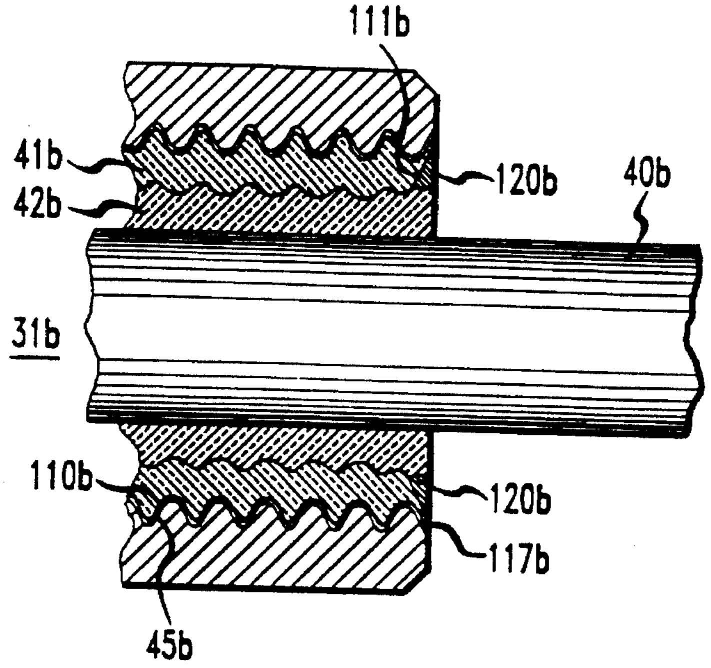
FIG. 11 is a front elevation, taken as indicated by the arrows 11—11, in FIG. 10, of the front portions of such ferrule and receiver coaxial line.
Figure 12:
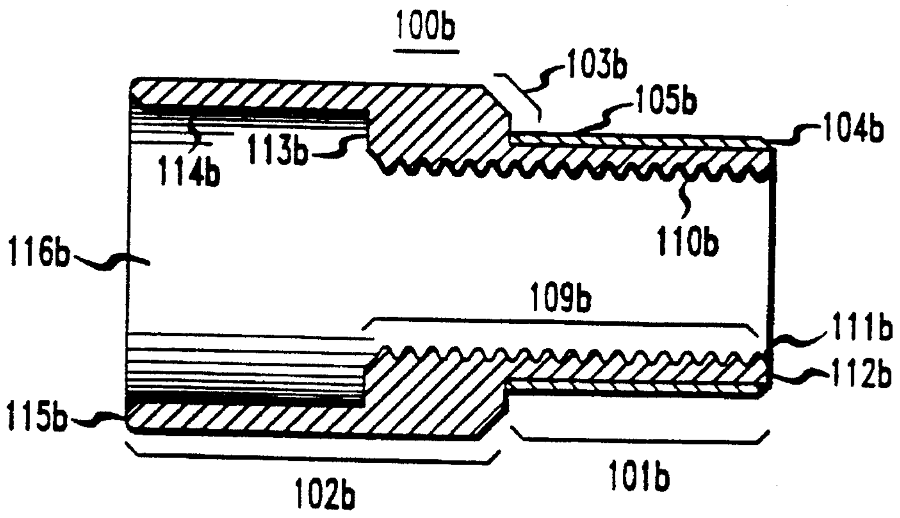
FIG. 12 is a front elevation view in cross section of the FIG. 9 ferrule.
Figure 13:
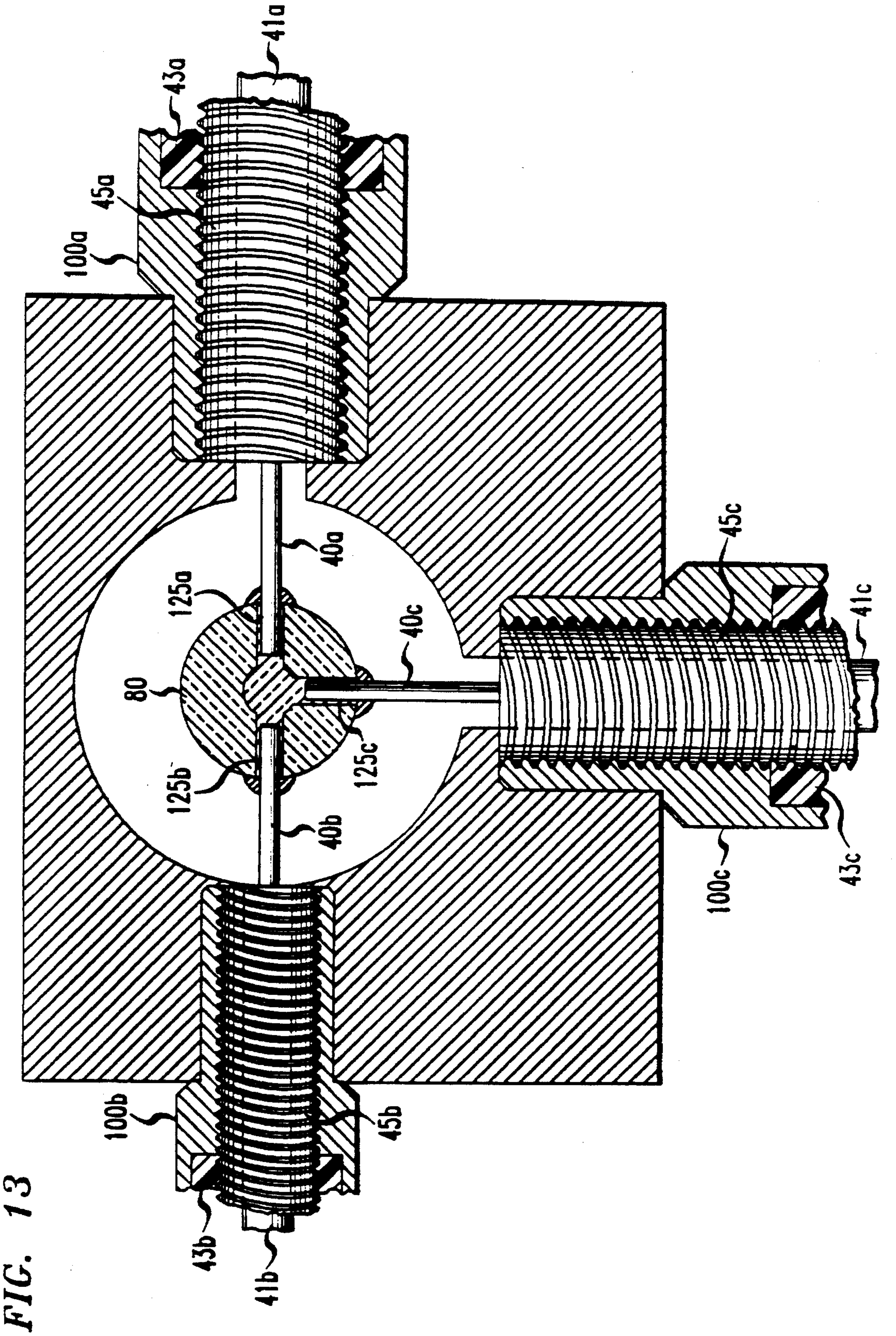
FIG. 13 is an enlarged plan view in cross section of the mentioned block, disc, ferrules and coaxial lines of the FIG. 2 duplexer with such ferrules and lines being shown broken away.

As well shown in FIG. 11 for the outer conductor 41*b* of the receiver coaxial line 31*b*, the outer conductors of all of lines 31 are in the form of thin flexible metallic tubes having no discontinuities in the metallic material constituting such tubes. Those conductors 41 thus contrast with braided outer conductors wherein there are discontinuities between the braided filaments thereof. Each of conductors 41 has formed therein a lengthwise extending helical convolution imparting flexibility to the conductor and causing the configuration of the outer conductor in cross-sectional planes through its axis to be a lengthwise alternation of ridges and valleys in the point-to-point radial displacement of the outer conductor from such axis. As a result, the outer conductors 41 of all of the coaxial lines 31 have thereon respective external helical threads 45 (FIG. 13).

The coaxial lines 31 as shown in FIG. 3 are (in completing duplexer 25) provided at their remote ends with respective coaxial end connectors 50*a*, 50*b*, 50*c* (FIG. 2) obtainable from the mentioned Andrews Corporation and of the types designated by it as 44SEW-12, 41ASW-12 and 49600-12 for the connectors used with the lines 31*a*, 31*b* and 31*c*, respectively. All of such connectors are generally similar in structure and are exemplified by the connector 50*a* of which details are shown by FIG. 3. As illustrated in that figure, the connector 50*a* has metallic parts comprising (a) a tubular clamping nut 51*a* screwed onto the outer conductor 41*a* of the line 31*a*, and then soldered to that outer conductor (b) a projecting contact pin 52*a* soldered to the stub end of the line's inner conductor 40*a* projecting out beyond the termination of the outer conductor 41*a* and (c) a coupling nut 53*a* rotatably mounted on a coupling body (not shown) in turn screwed onto a helically threaded portion 54*a* of the clamping nut 51*a* to be fastened to that nut. The coupling nut 53*a* is adapted by rotation thereof to couple the remote end of the line 31*a* to the coaxial fitting 56 providing (FIG. 1) the output port for the transmitter filter 26.

Further published information on the end connectors 50 is available from the Andrews Corporation.

The metallic parts of the coaxial end connectors 50 are mostly conventional parts interiorly constituted of a metallic material comprising copper in that such material is either copper itself or an alloy thereof. In the duplexer 25, however, those metallic parts are customized in that such metallic parts consist entirely of nonferromagnetic materials, i.e., do not include in their plated coatings or otherwise any nickel or other ferromagnetic material which could generate intermodulation products. All the coaxial tines 31 of the duplexer 25 also consist entirely of nonferromagnetic materials. Further, because the lines 31 do not contain any discontinuities (such as are present in coaxial lines with braided outer conductors), the lines 31 are free of structural features which could cause contact non-linearities. Accordingly, the components 31 and 50 of the duplexer cannot serve as sources of intermodulation products caused by the presence of ferromagnetic materials.

There remains the problem of avoiding the generation of such products from contact non-linearities. That goal is served in duplexer 25 by the nature of the T junction coupling means which includes as components a block 60, a cap 61 for the block, a disc 80 supported in the block and three ferrules 100*a*, 100*b* and 100*c* respectively corresponding to and fitted on the junction ends of the coaxial lines 31*a*, 31*b* and 31*c*.

Figure 4:
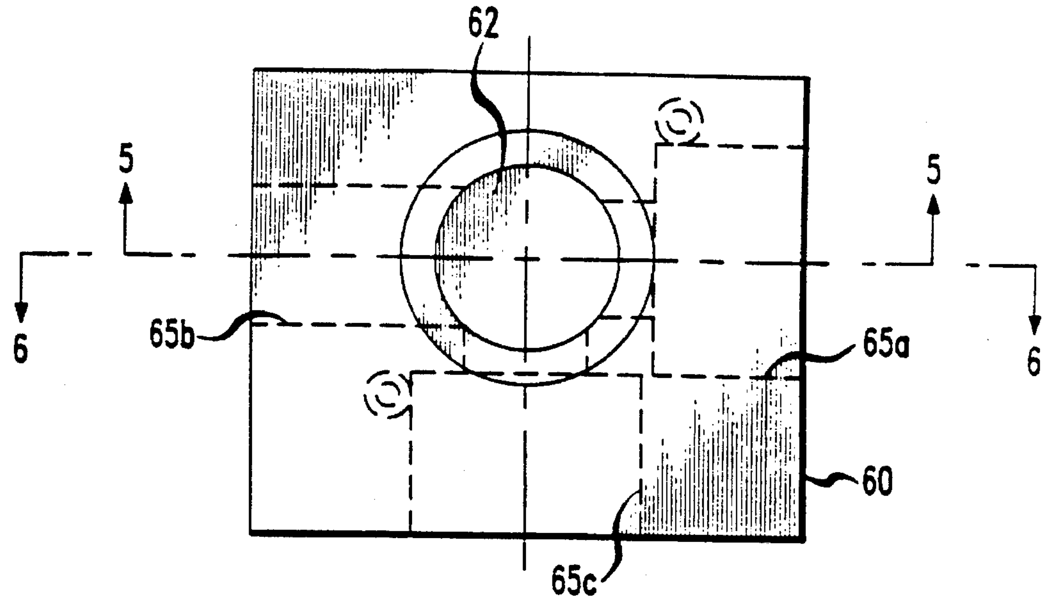
FIG. 4 is an enlarged plan view of the block included in the T junction coupling means of the FIG. 2 duplexer.
Figure 5:
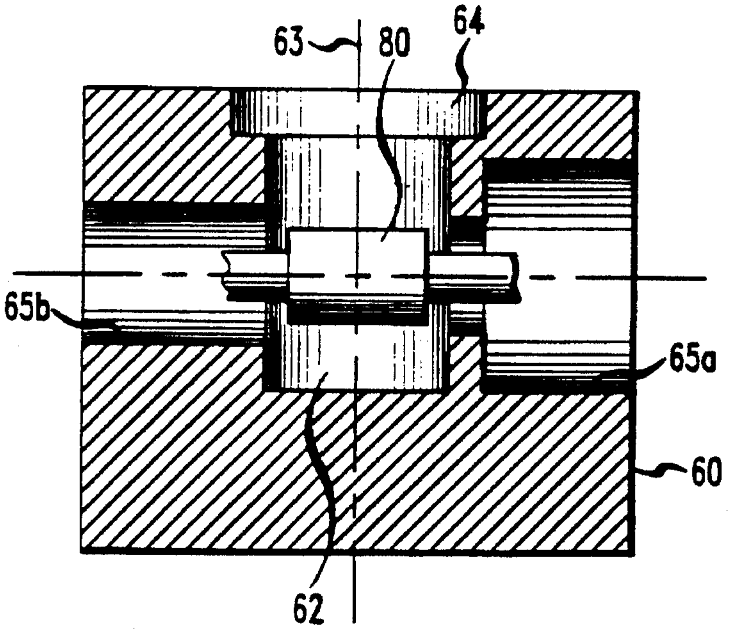
FIG. 5 is a front elevation, not to scale, of the FIG. 4 block taken in cross-section as indicated by the arrows 5—5 in FIG. 4 and, also, of a disc component of the T-junction coupling means when such disc is disposed in such block and has received therein the inner conductors (shown in broken away form) of the mentioned coaxial lines.
Figure 6:
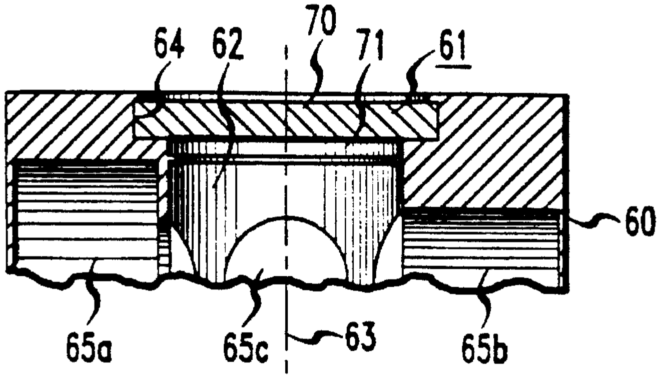
FIG. 6 is a broken away rear elevation in cross-section, taken as indicated by the arrows 6—6 in FIG. 4, of the FIG. 4 block and of the cap component of the mentioned T junction coupling means.

Referring to FIGS. 4–6, the block 60 is a metallic block interiorly constituted of oxygen free copper. The block has formed therein a circular cylindrical cavity 62 having a vertical axis 63 and accessible from a position above the block through a lop opening 64 in the form of a countersink having a slightly greater radius than the cavity itself. Also formed in block 60 are three circular cylindrical smooth-walled bores 65*a*, 65*b* and 65*c* located on, respectively, the right-hand side, left-hand side and front of the block and extending horizontally through it from its outside to its central cavity 152. Bores 65*a* and 65*c*, have sections of reduced diameter adjacent to the cavity. Outward of those reduced diameter sections, the bores 65*a*, and 65*c* have main sections with diameters greater in size than, but proportioned to, the outer diameters of, respectively, the transmitter coaxial line 31*a* and the antenna coaxial line 31*c*.

Figure 7:
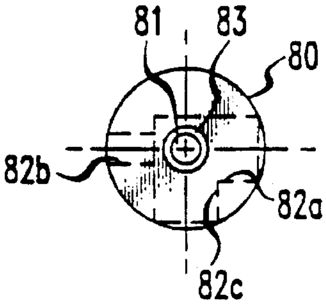
FIG. 7 is a plan view of the mentioned disc.
Figure 8:
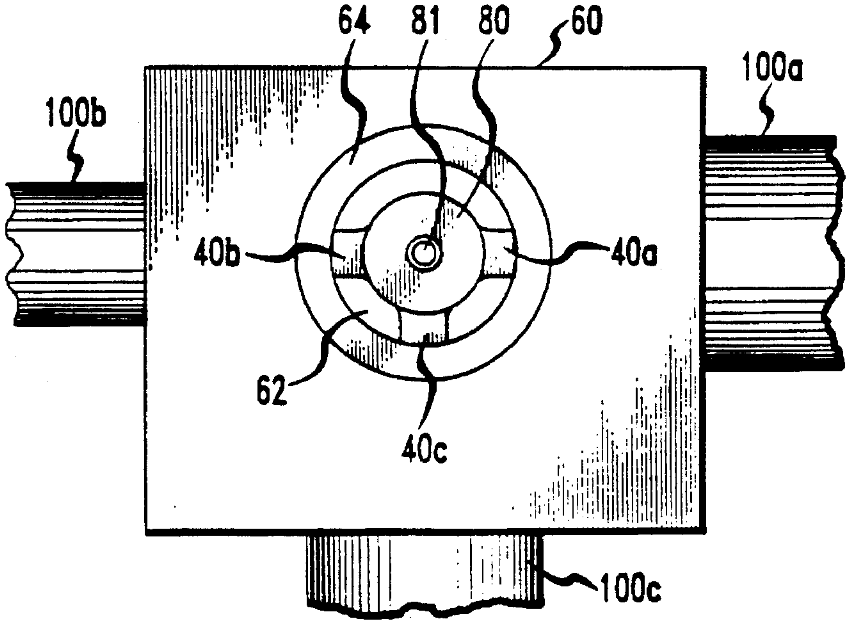
FIG. 8 is a broken away plan view of the FIG. 4 block, such disc, the inner conductors of the coaxial lines, and of three ferrules associated with such block.
Figure 9:
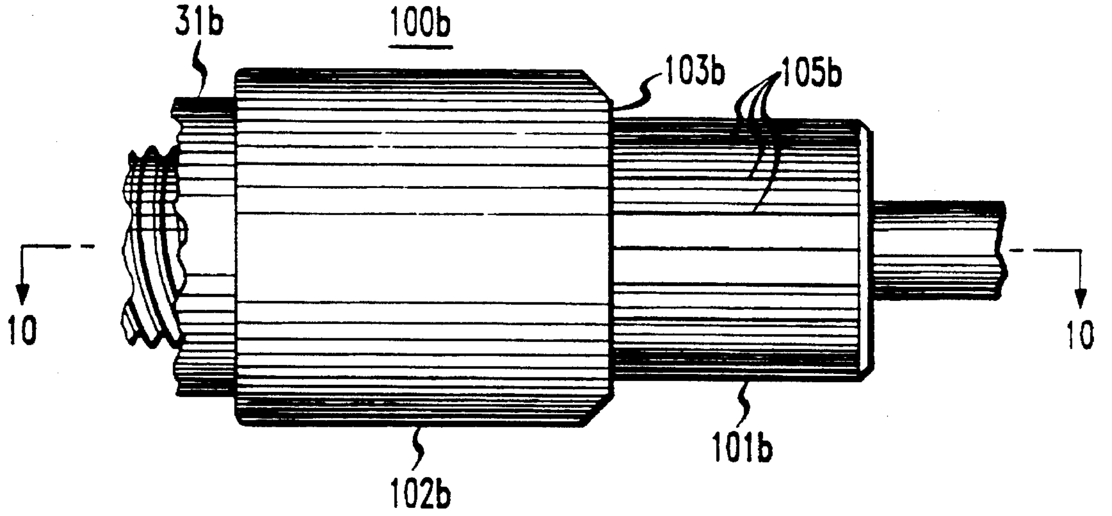
FIG. 9 is a broken away front elevation of a ferrule of the FIG. 2 duplexer on the junction end of the receiver coaxial line of the duplexer.
Figure 10:
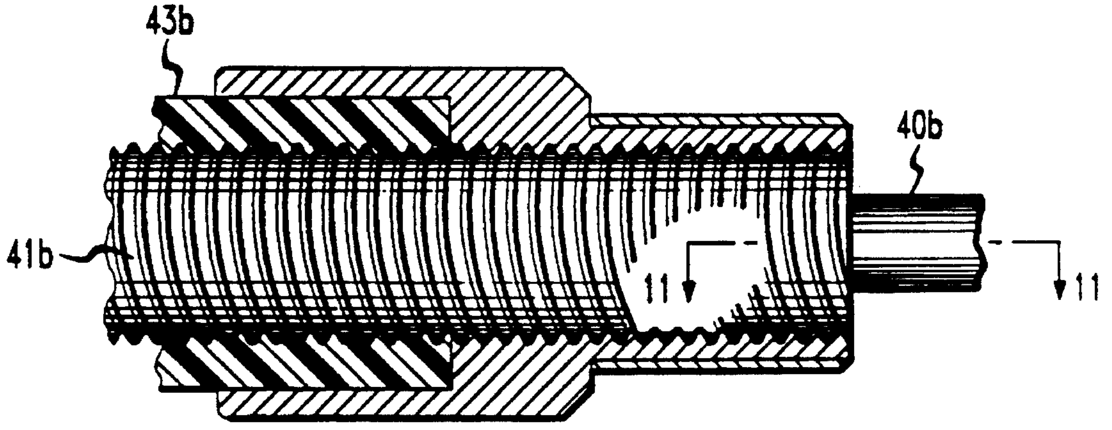
FIG. 10 is a plan view in cross-section, taken as indicated by the arrows 10—10 in FIG. 9, of such ferrule and junction end.

The cap 61 is in the form of a solid discoid constituted interiorly of oxygen free copper. The cap has an upper part 70 (FIG. 6) seatable with a friction fit into opening 64 in block 60 and, also, a lower part 71 shown as extending for a short distance down into the cavity 62 in the block. The circumferential wall of the top opening 64 in the block is swaged to retain the cap 61 in that opening in the absence of force being exerted on the cap to overcome its friction fit within block 60. The disc 80 (FIGS. 5, 7 and 8) is a circular cylindrical part interiorly constituted of oxygen free copper. The disc contains therein a vertically extending circular cylindrical central space 81 closed at the bottom and having a top opening 83. Formed in the right side, the left side and the front of the disc are (FIG. 7) three horizontal passages 82*a*, 82*b* and 82*c* respectively corresponding to the bores 65*a*, 65*b* and 65*c* in block 60. Those passages are designed for the respective receptions therein of the inner conductors 40*a*, 40*b* and 40*c* of the coaxial lines 31.

Turning now to FIGS. 9–13, the ferrules 100*a*–100*c* have similar structures exemplified by the ferrule 100*b* shown in FIGS. 9–12. Referring to those latter figures, the ferrule 100*b* is in the form of a metallic tubular sleeve constituted interiorly of brass. The sleeve is divided longitudinally into a forward section 101*b* of reduced outer diameter, and a rearward section 102*b* of full outer diameter. The sleeve has on its outside a forward-facing annular shoulder 103*b* extending between the respective exteriors of the sections 101*b* and 102*b*. The outer circumferential surface of forward section 101*b* is of generally circular cylindrical shape but is mechanically worked to have thereon a front chamfer 104*b* and knurling in the form of a series of axially extending radially raised ridges 105*b* (FIG. 9) angularly spaced from each other around the circumference of the forward section. The outer diameter of the knurled section 101*b* of ferrule 100*b* is of slightly greater diameter than the inner diameter of the respectively corresponding bore 65*b* in block 60 when (a) such outer diameter is measured at the outer surface of the raised knurling ridges 105*b*, and (b) that forward portion 101*b* is radially uncompressed.

The ferrule 100*b* has an interior wall 109*b* (FIG. 12) having helical threads 110*b* thereon which match the external helical threads 45*b* on the outer conductor 41*b* of the receiver coaxial line 31*b*. The inner wall 109*b* intersects at its front with an internal annular chamfer 111*b* (FIG. 12) slanting radially outward in the forward direction from wall 109*b* to an intersection of the chamfer with the front face 112*b* of the ferrule. From that chamfer 111*b*, the threaded wall 109*b* extends rearwardly all the way through the forward section 101*b* of the ferrule and part way through its rearward section 102*b* to an intersection of wall 109*b* with an annular rearward-facing shoulder 113*b* on the inside of the ferrule. The internal shoulder 113*b* extends radially between threaded interior wall 109*b* and a larger diameter smooth rear interior wall 114*b* running within rearward section 102*b* from the shoulder 113*b* to the back end 115*b* of the ferrule. The wall 114*b* encloses within the ferrule a rear chamber 116*b*.

All of the components of the T junction coupling means 30 are internally constituted of metallic material comprising copper in that the block 60, cap 61 and disc 80 are interiorly of constituted oxygen free copper, and the ferrules 100*a*, 100*b* and 100*c* are interiorly constituted of brass. All of such components are covered over their entire exteriors with a plated layer of silver of a thickness of from about 500 microinches to about 800 microinches. The T junction coupling means 30 as a whole and each of its described components 60, 61, 80 and 100*a*–100*c* consist entirely of nonferromagnetic materials.

The ferrule 100*b* is assembled onto the junction end of the receiver coaxial line 31*b* in a manner as follows. The line is first prepared at that end by trimming its jacket 43*b* and outer conductor 41*b* back from the inner conductor 40*b* to leave exposed a projecting length of conductor 40*b*, and by then trimming jacket 43*b* back from the outer conductor 41*b* to leave a bare part of the outer conductor projecting out beyond the termination of the jacket. When thus prepared, the junction end of line 31*b* resembles the remote end of such line as that remote end is shown in FIG. 3.

As the next step, the projecting junction end part of inner conductor 40*b* is passed through the ferrule 100*b* to position the ferrule just outward of and aligned with outer conductor 41*b*. The ferrule is then moved and turned to engage the threads 110*b* on the interior of the ferrule with the threads 45*b* on conductor 41*b* and, by such engagement and further turning, to advance the ferrule. The ferrule is thus screwed onto the junction end of the cable 31*b* to progressively insert the front part of the cable ensheathed by its plastic jacket 43*b* into the ferrule's rear chamber 116*b*, and to insert its outer conductor 41*b* into the passage bounded by the ferrules interior wall 109*b*. Such advancement continues until further rearward movement of the ferrule on the cable is stopped by the coming into contact of the front end of jacket 43*b* with the ferrule's internal shoulder 113*b*. Shoulder 113*b* thus performs the function of limiting the advance of the ferrule over the jacket 43*b* of the cable to a fixed distance equal to the length of the ferrule's rear chamber 116*b*. At the stoppage point, the portion of jacket 43*b* projecting into the ferrule is received with a close fit in the ferrule's rear chamber 116*b* and, if the junction end of coaxial line 31*b* has been prepared properly, the front of the bare part of outer conductor 41*b* will be at the same longitudinal position as the front 112*b* of the ferrule. The presence of shoulder 113*b* provides the advantage that its stopping action establishes a known predetermined distance by which, by trimming of jacket 43, the termination of the jacket will be spaced back from such front of conductor 41*b* to produce longitudinal registration of such front with the front 112*b* of the ferrule.

With the fronts of the outer conductor and the ferrule being in longitudinal registration as just described, the front tip 117*b* (FIG. 11 ) of the conductor 41*b* is flared radially outward to lie against the internal chamfer 111*b* at the front of the ferrule but to terminate in the radial direction short of the radially outer extremity of that chamfer. Hot liquid solder is then applied to the front of the ferrule and outer conductor to form a deposit 120*b* (FIG. 11) of such solder which is of annular configuration, and which overlies both a radially outward portion of the chamfer 111*b* on the ferrule and a portion of the outer conductor's front tip 117*b* to bridge those two portions. When the solder cools and solidifies, the resulting solder ring 120*b* provides between the ferrule 100*b* and the outer conductor 41*b* of the cable 31*b* a metallic connection which integrally couples such ferrule and conductor so that there are no spatial discontinuities in the transmission path for microwaves from the ferrule to the outer conductor, and conversely. Hence, the ferrule and outer conductor are electromechanically coupled in such manner as to avoid the creation at the coupling of contact non-linearities which might be the cause of intermodulation products.

In the same way, the ferrules 101*a* and 101*c* are fitted onto the junction ends of the transmit and antenna coaxial lines 31*a*, 31*c* and are then coupled by solder to the outer conductors 41*a*, 41*c* of those lines in the manner just described so as to avoid the creation of contact non-linearities by such couplings.

With the ferrules 101*a*–101*c* and the lines 31*a*–31*c* being so combined, the fabrication of the duplexer 25 is completed by assembling the T junction coupling means 30 in the following manner. With the cap 61 being removed from the block 60, the block (FIG. 13) is held by a fixture (not shown) in fixed position. The disc 80 is next lowered into the block's central cavity 62 through its top opening 64 and is held by a jig or other means (not shown) in cavity 62 so that the axes of the passages 82*a*, 82*b*, 82*c* in the disc are respectively aligned with the axes of the bores 65*a*, 65*b*, 65*c* in the block.

Thereafter, each of the coaxial line-ferrule combinations is manipulated, one at a time, to press fit the ferrule of the combination into the corresponding bore in the block and to insert concurrently the forwardly projecting end of the inner conductor of the line into the corresponding passage in the disc. That is, first, say, the ferrule 100*a* on the junction end of line 31*a* is press-fitted into the bore 65*a* in block 60 and, concurrently, the projecting end of the inner conductor 40*a* of the line is inserted into the passage 82*a* in the disc. The same procedure is then followed to press fit the ferrules 100*b* and 100*c* into bores 65*b* and 65*c* while, concurrently, the projecting ends of the inner conductors 40*b* and 40*c* of the associated lines 31*b*, 31*c* are inserted into the passages 82*b*, 82*c* of the disc.

When the steps described above have been completed, hot liquid solder is introduced into the central space 81 (FIG. 7) of disc 80 through the space's top opening 83. The solder flows into the disc passages 82*a*–82*c* and there cools to form in those passages (and at their outside openings of) solid solder deposits 125*a*, 125*b*, 125*c* (FIG. 13) which electromechanically unite the conductors 40*a*–40*c* in those passages to the body of disc 80. The result is that all those conductors are electrically coupled together at a common electrical junction thereof. Such mode of coupling together the inner conductors of the coaxial lines avoids the creation by such coupling of any contact non-linearities which could cause intermodulation products to be generated.

With the inner conductors being inserted into the passages in disc 80 and then soldered in those passages to the disc, the inner conductors support disc 80 in the cavity 62 in block 60 in fixed relation to the block and in spaced relation from the bounding walls of that cavity.

The ferrules 100*a*–100*c* are press-fitted into the block bores 65*a*–65*c* with considerable force. Specifically, forces from about 2000 lbs. for the smaller ferrule 100*b* to about 2500 lbs. for the larger ferrules 100*a* and 100*c* are used to drive them into their corresponding bores in block 60 until further advance is stopped by the coming into contact with the outside of the block of the outer shoulders 103 on the ferrules. Such stopping of the advance of the ferrules by their shoulders is advantageous because it prevents the soldered connections 120 at the front of the ferrules (such as connection 120*b* in FIG. 11) from being damaged by being forced against the annular rearward facing shoulders formed in bores 65 at the juncture of their full diameter main sections and reduced diameter forward sections.

The press fits of the ferrules into their bores results in the knurled forward sections 101 of the ferrules being radially compressed to produce between the ferrules and block a maintained pressure contact which eliminates any possibility of looseness of contact between the ferrules and block and, hence, of any contact non-linearity which might be caused by that looseness. Thus, the carrier described solder coupling of the outer conductors 41 of lines 31 to the ferrules 100 and the coupling also of those ferrules through maintained pressure contact to the block 60 is a development which enables all those outer conductors through their corresponding ferrules and block to be electrically coupled together at, in effect, a common electrical junction in a manner whereby no or minimum contact non-linearities result.

Some other advantages provided by the duplexer 25 are as follows. First, the engagement (FIGS. 12 and 13) of the internal helical threads 110 of the ferrules with the external helical threads on the outer conductors 41 of the coaxial lines 31 serves to provide a strain relief against pulling forces exerted on lines 31 and likely in the absence of such strain relief to disrupt the solder bond 120*b* (FIG. 11) between the ferrules 100 on those lines and their outer conductors 41. Second the containment with a close fit in the ferrules rear chambers 116 of the junction ends of the lines 31, including their plastic outer jackets 43, is a feature providing strain relief against bending, twisting and kinking of those lines. Third, a T junction coupling means of the structure shown in FIG. 13 eliminates the earlier mentioned six connectors previously used at the T junction. Fourth, the presence on the exteriors of all the components of the T junction coupling means 30, as well as on the exteriors of the metal parts of the remote end connectors 50, of a relatively thick layer (about 500 microinches to about 800 microinches) of plated silver is a feature which significantly reduces resistance losses (and prevents non-linearity due to corrosion) in microwaves transmitted through the duplexer 25.

Final steps in assembling the T junction coupling means 30 are (a) to release from disc 80 and remove from cavity 62 the grasping means (not shown) which initially held the disc in the cavity, and (b) to then seat the cap 61 with a friction fit in the top opening 64 for the cavity 62 in block 60. The seated cap performs the useful functions of sealing off the soldered connections of the inner and outer conductors 40 and 41 of lines 31, and of maintaining matched electrical impedance inside the cavity 62 in the block 150. With cap 61 being so seated, the duplexer 25 is ready for installation in the system shown in FIG. 1.

The above described embodiment being exemplary only, it is to be understood that additions thereto, omissions therefrom and modifications thereof can be made without departing from the spirit of the invention and that accordingly the invention is not to be considered as limited save as is consonant with the recitals of the following claims.

We claim:

1. A microwave duplexer comprising:

a metallic "T" junction block having a top, bottom and sides and having formed therein a central microwave transmitting cavity accessible by way of an opening to an outside of said block, said block also having formed therein three unthreaded bores horizontally extending through respective walls of said block from the outside to said cavity;

three coaxial lines respectively corresponding to said three bores, each of said lines comprising concentric radially spaced outer and inner metallic conductors extending between a junction end of said each of said lines at said block, and a remote end of said each of said lines away from said block, the outer conductor of said each of said lines having a forward portion at the junction end within the corresponding bore in said block, and the inner conductor of said each of said lines extending at its junction end radially inward beyond its outer conductor to a common electromechanical junction in said cavity with the inner conductors of others of said lines;

three tubular metallic ferrules respectively corresponding to said three lines and fitted on the three lines at their junction ends, each of said ferrules having an unthreaded forward portion with external knurling, wherein the forward portion is seated in press fitted relation in the corresponding bore in said block, said bore being of smaller diameter than an outer diameter of an outer surface of said knurling when said forward portion is radially uncompressed so as to produce maintained pressure contact between the knurling on said ferrule and said block; and metallic connections integrally uniting the forward portion of said each of said ferrules and the outer conductor of a corresponding line to provide between said forward portion of said each of said ferrules and said outer conductor a mechanically and electrically continuous path for transmission of microwave energy.

2. A duplexer according to claim 1 in which each of said metallic connections is a solder connection extending between, and integrally joined to, front ends of the forward portions of respectively, a respective one of said ferrules and the outer conductor of the coaxial line corresponding to said one of said ferrule.

3. A duplexer according to claim 1 in which each of said ferrules has a rearward portion projecting outwardly from said block and enclosing the corresponding coaxial line with a close fit to provide strain relief therefor.

4. A duplexer according to claim 3 in which said rearward portion of each of said ferrules is of larger inner diameter than said forward portion of said each of said ferrules, the outer conductor of the coaxial line corresponding to said each of said ferrules is ensheathed by a plastic jacket having at the junction end of said line an end portion which terminates short of said forward portion of said outer conductor of said line, and said rearward portion of said each of said ferrules contains with a close fit said end portion of said plastic jacket.

5. A duplexer according to claim 3 in which said rearward portion of each of said ferrules is of larger outer diameter than said forward portion thereof and in which an annular forward facing shoulder extends outside of said ferrule between respective exterior surfaces of said rearward and forward portions thereof.

6. A duplexer according to claim 1 in which said forward portion of each of said ferrules has internal helical threads formed on an interior wall thereof, and in which the outer conductor of the coaxial line corresponding to said each of said ferrules has external helical threading engaging with said helical threads in said each of said ferrules.

7. A duplexer according to claim 1 in which said duplexer further comprises a metallic disc disposed in said cavity in said "T" junction block in spaced relation from interior walls of said block bounding said cavity, said disc having formed therein a central interior space, a top opening for said space, and three passages which extend horizontally from the outside of said disc to said space, wherein the passages have respectively received therein forward portions of the inner conductors respective to said three coaxial lines, said forward portions of said three inner conductors being soldered to said disc to thereby provide said common electromechanical junction of said three inner conductors.

8. A duplexer according to claim 1 in which said opening in said block for said cavity is a top opening therefor, and in which said duplexer further comprises a cap seatable in said top opening to provide a top closure for said cavity.

9. A duplexer according to claim 7 in which said opening in said block for said cavity is a top opening therefor, and in which said duplexer further comprises a cap seatable in said top opening to provide a closure for said cavity.

10. A duplexer according to claim 9 in which each of said block, said disc and said caps (a) consists entirely of nonferromagnetic materials (b) is interiorly constituted of a metallic substance comprising copper and (c) has on its outside a silver coating.

11. A duplexer according to claim 10 in which said silver coating has a thickness of at least 500 microinches.

12. A duplexer according to claim 11 in which each of said three coaxial lines is terminated at its end remote from said "T" junction block by a coaxial connector comprising metallic parts, and in which said metallic parts of each of said connectors each consists entirely of nonferromagnetic materials and has on exterior thereby a precious metal coating.

13. A duplexer according to claim 1 in which said duplexer consists entirely of nonferromagnetic materials.

14. A microwave duplexer comprising:

at least three coaxial lines extending from respective junction ends thereof at a common junction zone for said lines to remote ends of said lines away from said zone, each of said lines comprising concentric radially spaced outer and inner conductors with the outer conductor of each of said lines being an unbraided tubular metallic shell having formed therein a longitudinally extending helical convolution having in cross-section through an axis of said shell a lengthwise alternation of ridges and valleys in radial displacement of said shell from said axis;

T junction coupling means mechanically coupled at said zone with the junction ends of said lines, said T junction means electrically coupling the outer conductors of all said lines together and the inner conductors of all said lines together; and at least three tubular metallic ferrules respectively electrically connected to said junction ends of said lines, each of said ferrules having an unthreaded forward portion with external knurling seated in press fitted relation in a corresponding bore in said T junction means, each of said bores is of smaller diameter than the outer surface of said knurling when said forward portion is radially uncompressed so as to produce maintained pressure contact between the knurling on said ferrule and said T junction means.

15. A microwave duplexer comprising:

a metallic T-junction block having therein a central microwave transmitting cavity bounded by walls provided by said block and at least three unthreaded bores passing through said walls of said block from its outside to said cavity;

at least three coaxial lines each comprising concentric radially spaced outer and inner conductors with the outer conductors being unbraided tubular metallic shell having external helical threads thereon, and with the inner conductors projecting forward from said outer conductor at a junction end of said lines; and a plurality of tubular metallic ferrules each having an externally unthreaded forward portion with external knurling thereon, and each having internal helical threads, each of said ferrules being screwed onto a respectively corresponding one of said lines at its junction end so that said threads on, respectively, said ferrule and the outer conductor of the corresponding one of said lines are engaged, and each of said ferrules being thereby electromechanically united with the outer conductor of the corresponding one of said lines and having said forward portion thereof press-fitted into a respective one of said bores, wherein each of said bores is of smaller diameter than that of an outside surface of said knurling when radially uncompressed so as to electrically couple said outer conductors and said block through maintained pressure contact between the knurling on said ferrule and said block, the inner conductor of said one of said lines extending from said each of said bores into said cavity to a common electromechanical junction thereon of said inner conductor with the inner conductors of the other lines.

16. A coaxial coupling device comprising:

a flexible coaxial cable comprising concentric radially spaced outer and inner conductors, and a plastic jacket ensheathing the outer conductor longitudinally rearward of a connecting portion of said outer conductor, said inner conductor projecting forward beyond said connecting portion of said outer conductor, said outer conductor forming a metal tube having a threaded exterior surface;

a ferrule comprising, a tubular metallic sleeve having a rearward portion and a forward portion that is externally knurled by a series of axially extending radially raised ridges angularly spaced from each other around a circumference of said forward portion, an interior surface of said forward portion of said ferrule engagingly receiving said connecting portion of said outer conductor, a front end of said connecting portion is at a same longitudinal position and radially adjacent a front end of said forward portion of said ferrule, and an annular chamfer intersecting said front end of said forward portion between said front end of the connecting portion and said interior surface of said forward portion; and a ring of solder external to said ferrule filling said annular chamfer to provide a mechanically continuous metallic connection to prevent spatial discontinuities in the transmission path for microwaves from the ferrule to the outer conductor, wherein said rearward portion of said ferrule having a greater inner diameter than said interior surface of said forward portion of said ferrule and receiving a length of said jacket greater than its inner diameter with a close fit into said rearward portion of said ferrule, and said ferrule including an annular backward facing shoulder extending from an interior wall of said rearward portion of said ferrule to the interior surface of said forward portion.

17. The coaxial coupling device, according to claim 22, wherein said rearward portion of said ferrule has a greater outer diameter than said forward portion of said ferrule, said ferrule having an annular forward facing shoulder extending from an exterior surface of said rearward portion to the exterior knurled surface of said forward portion, said exterior knurled surface of said forward portion having an outer diameter less than the inner diameter of said rearward portion of said ferrule.

* * * * *